April 14, 1942.   E. D. DICKINSON   2,279,814
PACKING ARRANGEMENT
Filed Dec. 24, 1940
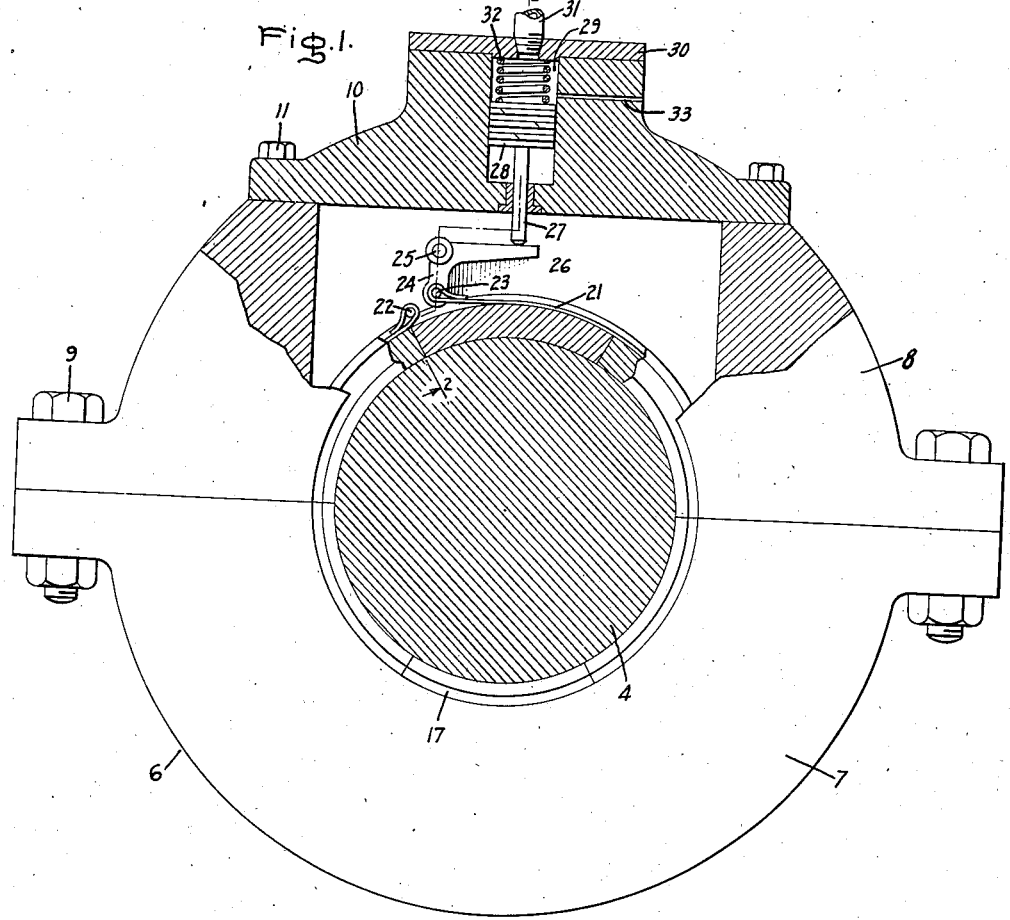
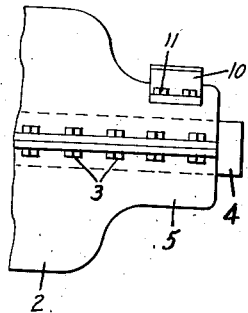
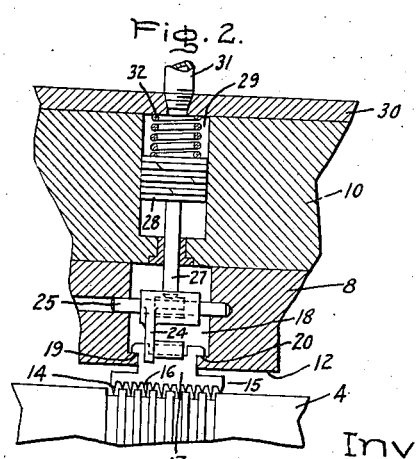
Inventor:
Edgar D. Dickinson,
by Harry E. Dunham
His Attorney.

Patented Apr. 14, 1942

2,279,814

UNITED STATES PATENT OFFICE 2,279,814

PACKING ARRANGEMENT

Edgar D. Dickinson, Beverly, Mass., assignor to General Electric Company, a corporation of New York Application December 24, 1940, Serial No. 371,472

6 Claims. (Cl. 286—20)

The present invention relates to packing arrangements for reducing the leakage of fluid along a shaft passing through an opening in a casing. More specifically, the invention relates to the type of packing arrangements which include a packing ring or rings having a plurality of segments and means for holding such segments in sealing position. In carbon type packings with packing rings composed of a plurality of segments it is customary to bias the segments towards each other, that is, into arch-bound relation. In labyrinth type packings using metallic rings composed of a plurality of segments with grooved sealing surfaces it is customary to bias the segments towards shoulders formed by the packing casing so that the segments are practically arch-bound with their adjacent end faces either engaging each other or forming a clearance of a few mils only. Difficulties have been experienced with arrangements including springs as a means to hold the packing ring segments in position. The difficulties are partly due to changes of the spring characteristics effected at high temperatures.

The object of my invention is to provide an improved construction and arrangement of packings of the type above specified which may be safely operated at high temperatures as occur in modern elastic fluid turbines. This is accomplished in accordance with my invention by the provision of hydraulically actuated means for biasing a band around a packing ring to hold the ring segments in position. In a preferred embodiment of my invention the hydraulically actuated means is augmented by a compression spring arranged within and cooled by the operating fluid of the hydraulic means.

For a better understanding of what I believe to be novel and my invention, attention is directed to the following description and the claims appended thereto in connection with the accompanying drawing.

In the drawing Fig. 1 illustrates a sectional view of a packing arrangement embodying my invention; Fig. 2 is a section along line 2—2 of Fig. 1; and Fig. 3 shows an elastic fluid turbine with a packing arrangement embodying my invention.

The elastic fluid turbine shown in Fig. 3 comprises a shell 2 having lower and upper flanged parts secured together by a plurality of bolts 3. The shell has walls which form an opening through which a shaft 4 projects. In order to prevent leakage of fluid from the interior of the turbine along the shaft to the atmosphere and vice-versa, the shaft is sealed to the turbine shell by means of a packing arrangement 5. A packing arrangement as shown in Figs. 1 and 2 comprises a casing 6 having lower and upper halves 7 and 8 respectively secured together by means of a plurality of bolts 9 corresponding to bolts 3 in Fig. 3. The casing 6 may form an integral part of a turbine shell, as shown in Fig. 3. The upper half 8 of the casing 6 has a removable wall portion or cover 10 held in position by a plurality of bolts 11. The two halves form an opening 12 through which shaft 4 projects. In order to reduce leakage of fluid along the shaft past the casing, the shaft is sealed to the casing by means of a packing. In the present instance I have shown by way of example a labyrinth type packing comprising a runner or inner packing element 14 carried by and forming a part of the shaft comprising a plurality of spaced, annular sealing grooves and teeth. A stationary packing ring 15 supported on the casing 10 has an inner, cylindrical surface formed with spaced sealing grooves and teeth 16 in cooperative relation with the corresponding grooves and teeth of the element 14. The outer packing ring 15 is composed of a plurality of segments 17, six in the present instance, projecting into an undercut, annular groove 18 formed in the casing 10 and engaging shoulders 19 and 20 formed on opposite sides of the undercut groove 18. Three of the segments 17 are located in the lower half 7 of the casing 6 and the three other segments of the packing ring are located in the upper half 8 of the casing 6. The segments of the packing ring are inserted circumferentially into the undercut grooves 18 formed in the two casing halves.

In order to effect proper cooperation between the stationary packing ring 15 and the packing element 14 formed on the rotary shaft 13, it is necessary continuously to bias the segments of the stationary ring towards the shoulders 19 and 20. To this end the segments of the stationary ring are surrounded by a band 21. One end of this band is held on a pin 22 secured to the upper casing half and the other end of the band is held on a pin 23 secured to the end of an arm 24 of a bell crank lever held on a fulcrum 25 secured in a recess 26 in the upper casing half. The other arm of the bell crank lever according to my invention is engaged by a rod or stem 27 secured to a piston 28. The latter is slidably disposed within a cylindrical bore 29 formed in the wall 10 of the upper casing half 8 and closed by a cover plate 30.

Operating fluid under pressure, such as water, steam or the like, is conducted to the cylinder 29 by means including a conduit 31. During operation, the operating fluid forces the piston 28 downward, thereby turning the bell crank lever about the fulcrum 25 in clockwise direction and effecting tightening of the band 21 to bias the segments of the stationary packing ring into operating position, in the present instance into engagement with the shoulders 19 and 20. Thus, the segments are biased into operating position by means including a hydraulic motor and a bell crank lever having one arm engaging the free end of a band surrounding the segments and another arm engaged by the hydraulic motor. As stated above, the effect of the hydraulic means is augmented by means of a compression spring 32 enclosed in the cylinder 29 and biasing the piston 28 towards the bell crank lever. The provision of the compression spring broadly constitutes mechanical means for actuating the motor piston 28 and has the advantage of rendering the sealing arrangement effective during starting operation and also in case of failure of the supply of fluid through the conduit 21. From another viewpoint, the means for holding the segments of the packing ring in operative position includes a piston and a spring biasing the piston into operative position. The effect of the spring is augmented by the supply of fluid under pressure to the cylinder 29. In many instances, especially where the arrangement is used in combination with an elastic fluid turbine operated at high temperature, the fluid under pressure supplied to the cylinder 29 acts as a cooling medium for the spring 32, thus maintaining the temperature of the spring substantially constant and avoiding excessive changes of the spring charactertistic as may be caused by high temperature creep of the spring material. The cooling effect of the operating fluid supplied to the cylinder 29 may be increased by continuously circulating fluid through the cylinder. This may be accomplished by the provision of a narrow drain channel 33 for continuously draining fluid from the cylinder 29.

What I claim as new and desire to secure by Letters Patent of the United States is:

1. Packing arrangement for sealing the space between a casing subject to high temperatures and a shaft projecting through an opening in the casing comprising a packing ring having a plurality of segments for surrounding such shaft within the opening, and means including a band surrounding the segments and a hydraulic motor for biasing the segments towards each other.

2. Packing arrangement comprising a casing subject to high temperatures and having an opening with an annular undercut groove forming a shoulder, a packing ring having a plurality of segments engaging the shoulder and projecting into the opening for sealing the casing to a shaft projecting through the opening, and means for biasing the segments towards the shoulder comprising a band surrounding the segments, a pin supported on the casing for holding one end of the band, a bell crank lever fulcrumed on the casing and having an arm connected to the other end of the band and a hydraulic motor engaging the other arm of the bell crank lever.

3. Packing arrangement for sealing the space between a casing subject to high temperatures and a shaft projecting through an opening in the casing comprising a packing ring having a plurality of segments for surrounding the shaft within the opening and engaging the casing, and means biasing the segments into operating position comprising a band surrounding the segments and hydraulic means for tightening the band.

4. Packing arrangement comprising a casing subject to high temperatures and having an opening, a packing for sealing the casing to a shaft projecting through the opening comprising a packing ring having a plurality of segments for surrounding the shaft within the opening and engaging the casing, and means biasing the segments into operating position comprising a band surrounding the segments and hydraulic means for tightening the band, said hydraulic means including a cylinder formed in the casing, a piston movably disposed in the cylinder and having a stem, means connecting the stem to the band, means for conducting fluid under pressure to one end of the cylinder and spring means for augmenting the action of the fluid.

5. Packing arrangement comprising a casing having an opening, a packing for sealing the casing to a shaft projecting through the opening comprising a packing ring having a plurality of segments for surrounding the shaft within the opening and engaging the casing, means biasing the segments into operating position comprising a band surrounding the segments and means for tightening the band, said means including a hydraulic motor having a cylinder, a piston movably disposed in the cylinder and having a stem, means connecting the stem to one end of the band, means for conducting fluid under pressure to one end of the cylinder, spring means located in the cylinder and engaging the piston to augment the action of the fluid pressure, said spring means being immersed in operating fluid, and a drain port for the cylinder to effect continuous circulation of fluid therethrough in order to cool the spring.

6. Packing arrangement comprising a casing subject to high temperatures and having an opening, a packing for sealing the casing to a shaft projecting through the opening comprising a packing ring having a plurality of segments for surrounding such shaft within the opening, and means for biasing the segments toward each other, said means including a band surrounding the segments, a pin connecting one end of the band to the casing, a cylinder formed in the casing, a piston movably disposed in the cylinder and connected to the other end of the band and a biasing spring in the cylinder.

EDGAR D. DICKINSON.